Nov. 3, 1942.   S. L. GOLDSBOROUGH ET AL   2,300,886
HIGH SPEED WATTMETER TYPE RELAY
Filed Jan. 11, 1941   2 Sheets-Sheet 1

WITNESSES:
E. A. McCloskey
Wm. C. Groome

INVENTORS
Shirley L. Goldsborough
and Bert V. Hoard.
BY O. B. Buchanan
ATTORNEY

Patented Nov. 3, 1942

2,300,886

UNITED STATES PATENT OFFICE 2,300,886

HIGH-SPEED WATTMETER-TYPE RELAY

Shirley L. Goldsborough, Basking Ridge, and Bert V. Hoard, Millburn, N. J., assignors to Westinghouse Electric & Manufacturing Company, East Pittsburgh, Pa., a corporation of Pennsylvania Application January 11, 1941, Serial No. 374,110

32 Claims. (Cl. 175—294)

Our invention relates to high-speed wattmeter-type relays, and it has more particular relation to high-speed directional relays of the inductor-loop type, and it is an improvement over the protective apparatus which is described and claimed in a Leyland Patent No. 2,064,018, granted December 15, 1936, and assigned to the Westinghouse Electric & Manufacturing Company.

As is well known, the torque which is obtained in a single-phase directional or wattmeter-type element is a double-frequency pulsating torque, dependent upon the phase-angle between the applied current and voltage. For the phase-angle or power-factor producing the maximum relay-torque, this relay-torque never reverses, but reduces to zero twice in each cycle. At all other phase-angles or power-factors, double-frequency periods of negative torque-values are obtained, (two such periods per line-frequency cycle), until, at a certain phase-angle or power-factor displaced 90° from the optimum phase-angle or power-factor, the alternating positive and negative torques are equal to each other, so that the resultant torque is zero when integrated over a complete cycle of the line-frequency.

This pulsating-torque phenomenon imposes limitations on the design of high-speed sensitive directional or wattmeter-type relay-elements. To obtain high speed, the inertia of the moving parts of the relay should be made small, and the relay-forces should be made large. But this procedure of making the inertia small and the torque large cannot be carried very far because, if the movement of the rotor-member is made very fast, it will reverse, or vibrate back and forth, in response to the double-frequency reversals of the relay-torque. Even with the best compromise-design heretofore available, this double-frequency vibration limits the useable torque and the practically obtainable speed of operation, it prevents a steady contact of the contact-making element, and it too quickly wears out the bearings of the relay.

When an effort is made to obtain a polyphase directional response, certain difficulties have heretofore been encountered, more significant among which may be mentioned a difficulty which has been experienced in previous attempts to obtain a sufficiently low inertia of the rotatably-moving member, and a certain induction-motor effect or torque which we believe to be due to the rotating field set up by the different phases of the polyphase currents. In other words, previous polyphase designs have been subject to certain objectionable operational features which we believe may be traceable directly to the leakage-field fluxes between the three current-coils on electromagnets which are displaced 120° spatially around the relay-shaft or axis, and which are energized in displaced time-phases 120 electrical degrees apart, which are the two conditions necessary for obtaining an induction-motor effect or a rotating-field torque, due to the current alone. This effect is particularly disadvantageous in a sensitive relay having a low-inertia rotor-member, under severe three-phase fault-conditions on the protected line to which the directional relay is attached, because, under these fault-conditions, the current is very large, and the voltage is very small, so that the wattmetric torque dependent upon the product of the current and voltage is small, and may readily be overpowered altogether by the rotating-field torque which is responsive solely to the square of the current, so that the relay may operate always in the same direction, regardless of the direction of the power-flow in the protected line.

Of all of the types of high-speed wattmeter-type relaying elements which have been heretofore evolved, we believe that the inductor-loop type is the type which is the best adaptable for obtaining a minimum rotor-inertia and a compact overall design, with all of the desirable operating-characteristics. In this inductor-loop design, each single-phase element comprises a stationarily supported loop-type electromagnet-core having two side-legs and two yokes joining the respective ends of the side-legs, and having a reentrant center-leg extending from the mid-point of the rear yoke to an air-gap between the mid-point of the front yoke and the front end of said reentrant leg. Voltage-coils are placed on the side-legs to circulate a voltage-responsive flux loop-fashion around the electromagnet-core, while a current-coil on the center leg produces an air-gap flux dependent upon the current. The front yoke of the electromagnet-core is threaded through a light-weight loop or inductor-element which has one of its legs movably disposed in the air-gap, while the other leg of the loop is pivotally supported, the pivotally supported leg being thick, so as to reduce the electrical resistance without materially increasing the rotational inertia, while the air-gap leg is thin, both for the purpose of reducing the rotational inertia and for the purpose of making it possible to utilize a smaller air-gap.

An inductor-loop directional element of the type just described is subject, however, to the disadvantage of having a current-responsive centering-torque which is obtained whenever the loop is shifted at all from its midpoint position in which the plane of the loop is in line with the center-line of the reentrant central leg of the electromagnet-core. This current-responsive centering-torque results from the current-component which is induced in the loop in response to the air-gap flux whenever the loop is displaced out of its midpoint position in alignment with the current-leg of the electromagnet, this induced current-component producing a torque tending to return the loop to its central mid-position.

At times when the fault-current is very large, and the available line-voltage for producing a directional torque is accordingly very small, (because of a faulted condition of the line), this current-centering torque may be objectionable in limiting the sensitivity of the relay, or the ability of the relay to make a directional response when the available line-voltage is quite small. In the previously mentioned Leyland patent, the difficulties due to this current-centering torque were reduced considerably by introducing saturation-effects in the centrally disposed leg of the electromagnet, so that the relay would be sensitive under small or moderate current-conditions, when a high line-voltage was available for producing a strong directional torque, while desensitizing the relay as to current-responses which are obtained during heavy current-conditions which are sufficiently severe to produce saturation of the current-leg.

One of the objects of our invention contemplates improvements in the inductor-loop-type single-phase directional element, in still further reducing the current-centering torque thereof during excessive-current conditions, these improvements consisting, among other things, in making the center leg of the electromagnet long and placing the current-coil on the back part of the leg, as far away from the loop as possible, whereby to provide a leakage-flux path, in front of the current-coil, from the front portion of the center leg to the respective side-legs of the electromagnet. The saturation of the centrally disposed current-excited leg is retained, thus producing the effect of a larger air-gap under saturated conditions, thus increasing the leakage-flux under these conditions, and still further reducing the amount of the current-coil flux which reaches the air-gap under excessive-current conditions.

Another means which we utilize for mitigating the current-responsive centering-torque effect is to deliberately introduce a small amount of voltage-responsive decentering-torque, so that the voltage-responsive decentering-torque may be utilized to counteract the current-responsive centering-torque. We obtain a voltage-responsive decentering-torque by shaping the rear side of the front yoke of the electromagnet-core, at the midpoint thereof where the air-gap separates it from the front end of the reentrant central leg, so that it is bulged away from said reentrant leg, so as to have non-aligned surfaces on opposite sides of said air-gap. Thus, when the inductor-loop moves from its centered mid-position, in either direction, it approaches closer to the iron on the rear side of said front yoke, thus producing an attractive force which tends to draw the air-gap leg of the inductor-loop still closer over toward the front yoke of the electromagnet. We thus produce a decentering torque which is responsive to the current in the loop, which current is, in return, responsive to the voltage-flux which is circulated around the two outer legs of the electromagnet-core. While the attraction between a current-carrying conductor (such as the air-gap side of the inductor-loop) and an adjacent iron surface (such as the rear side of the front yoke) is small, for all currents except the most extremely large currents, there is nevertheless a sufficiently heavy loop-current, at times reaching a value of the order of 100 or 150 amperes, to produce a small, but sufficient, voltage-responsive decentering-torque as above-described.

In order to enhance this voltage-responsive decentering-torque, without obtaining a corresponding attraction between the inductor-loop and the iron of the front end of the reentrant central current-leg of the electromagnet, we also prefer to make the central current-leg narrow, at its front or air-gap end, thus not only enhancing the voltage-responsive decentering torque as just described, but also introducing the saturation-effect in the current-leg at portions thereof close to the air-gap.

An important aspect of our invention relates to a polyphase or plural-element embodiment of an inductor-loop-type directional relay which utilizes a plurality of spatially displaced single-phase elements in polyphase or out-of-phase electrical relation to each other. We have found that the pulsating torque of a single-phase element may be converted into a smooth non-pulsating torque by the use of phase-modifying means for converting the single-phase relaying quantity or quantities into a polyphase quantity or quantities, either two-phase or three-phase, utilizing two electromagnets with two inductor-loops in the two-phase embodiment, and utilizing three equally spaced electromagnets and loops in the three-phase embodiment. Or a polyphase directional-element may be obtained by utilizing polyphase voltages and polyphase currents derived from the different phases of a polyphase line to be protected, in a polyphase embodiment of our directional relay utilizing three single-phase elements stationarily supported in a common plane and in spaced relation about the axis of the relay.

In the three-element embodiment of our relay, an additional, and very important, advantage is to be noted from the bulging of the front yoke of each electromagnet, this bulging being apparent at the front or outside, as well as at the rear or inside portion thereof adjacent to the air-gap. Since the outside of each electromagnet is bulged at its front end, where it approaches closest to the axis of the relay, it will be noted that the front ends of the electromagnets become more or less segment-shaped, so that three or more of these electromagnets can be fitted around a common shaft, in a common plane at right angles to the shaft, which was not possible in previous straight-front electromagnets such as those which were utilized by Leyland. Furthermore, the bulging, or back-curving of the front ends of the electromagnets, serves the further very important function of spacing the adjacent electromagnets a considerable distance away from each other, thereby limiting the leakage-flux between adjacent electromagnets, and thus limiting the rotating-field torque which we have previously mentioned in connection with difficulties encountered in earlier designs of polyphase directional elements.

By the double expedient of placing our current-coils far back on an elongated central leg of each electromagnet-core, and bulging the front ends of the cores so that each core approaches close to the shaft while being widely spaced from each adjacent core, we achieve a design in which the induction-motor effect due to the rotating field of the current-coils is reduced to small, and practically negligible, values. By the proper choice of the polarities of the three current-coils, this small rotational-flux torque may be made to operate either in the relay-operating direction or the relay-restraining direction, as may be desired. The spacing of the three electromagnets also reduces the rotating-flux torque resulting from the voltage-coils to very small values which are altogether negligible during fault-conditions when the line-voltage is very much reduced, anyway, because of the fault.

A further object of our invention is to provide a polyphase wattmeter-type relay utilizing a plurality of single-phase wattmeter elements, each developing a pulsating single-phase torque responsive to the product of the two energizing quantities for the respective coils of the element, multiplied by a function of the phase-angle between said two quantities. The respective coils of the respective single-phase wattmeter elements are energized in various novel ways, according to our invention.

An important novel energizing-system for such a polyphase wattmeter relay, in accordance with our invention, utilizes a single set of polyphase relaying quantities, which may be a polyphase current or a polyphase voltage, a plurality of different pairs of said quantities being utilized to energize the respective coils of the respective single-phase wattmeter elements in such manner that the pulsating single-phase torques are at times out of phase with each other so as to produce a non-pulsating resultant torque under balanced conditions. This type of response is particularly desirable in producing a voltage-restraint in combination with other wattmeter elements for producing a directional response, the voltage-restraint being utilized with different pairs of the three phases of a three-phase relaying-voltage derived from the three phases of the protected line. In this manner we obtain a voltage-restraint which is steady, as distinguished from the pulsating voltage-restraints heretofore obtained. Our polyphase voltage-restraint automatically reduces itself to negligible values during fault conditions. Since the restraint is in proportion to the square of the voltage, it becomes altogether negligible at the low line-voltages which are obtained during balanced or three-phase faults. During unbalanced or single-phase faults, the restraint becomes zero if one delta-voltage is reduced to zero, because one of the applied voltages becomes zero on two of the electromagnets, while the other electromagnet has a zero angle between the two collapsed voltages, the torque being responsive to the sine of this angle.

The voltage-restraint can be removed, if desired, from our three-phase voltage-restraint arrangement, by opening any one supply-lead of the three-phase relaying voltages, because this applies a single-phase voltage to all three electromagnets, and makes the angle between voltages zero for each one.

A still further novel energizing-system which we have devised in connection with our polyphase form of embodiment of an induction-disc type of relay is a means for utilizing such a relay as a ground-fault directional element for producing a non-pulsating directionally responsive torque in response to zero-phase-sequence current and voltage derived from the protected polyphase line. Heretofore, ground-directional torques have been pulsatory in character, involving the double-frequency zero-torque periods previously mentioned, even at the optimum phase-angle, and involving two negative torque-periods or pulsations per cycle at less favorable power-factors of the ground-fault currents, and these ground-directional torque-pulsations have been very objectionable, not only in requiring that the relay be made much slower than desirable, in order to smooth out the pulsations, but also introducing difficulties, involving occasional faulty operations, when the ground-directional relaying-torque is produced in the same relay in which a polyphase directional relaying-torque is obtained, because of the tendency of the three-phase power-direction to control the response of the relay during periods of zero or negative ground-directional torques.

In accordance with our invention, we utilize a phase-modifying means in connection with both the zero-phase-sequence relaying-current and the zero-phase-sequence relaying-voltage, so that the three current-coils of our three-phase wattmeter-element are energized with balanced three-phase currents from a single, single-phase source of zero-phase-sequence or residual currents and so that the three sets of voltage-coils are energized with a polyphase system of voltages derived from a single, single-phase source of zero-phase-sequence or open-delta relaying-voltages. These results can be obtained with either three single-phase directional elements and a three-phase current and voltage transformation, or with two single-phase directional elements and a two-phase current and voltage transformation.

With the foregoing and other objects in view, our invention consists in the structures, combinations, methods and systems hereinafter described and claimed, and illustrated in the accompanying drawings:

Figure 1:
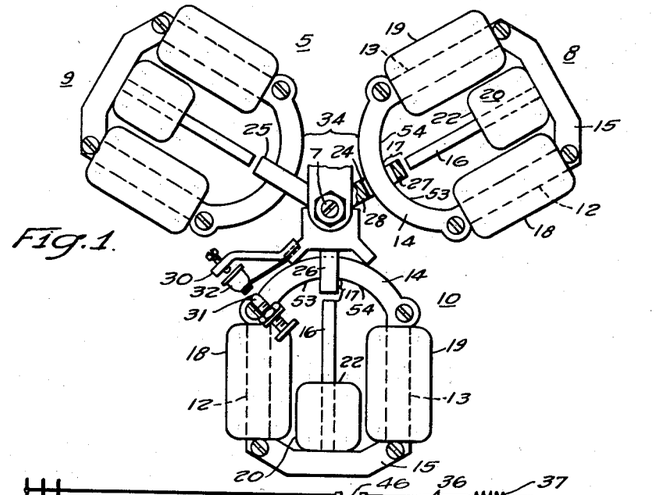
Figure 1 is a top plan view of a polyphase directional or wattmeter-type relay embodying our invention, with the supporting-frame or bracket broken away, for clarity of illustration.
Figure 2:
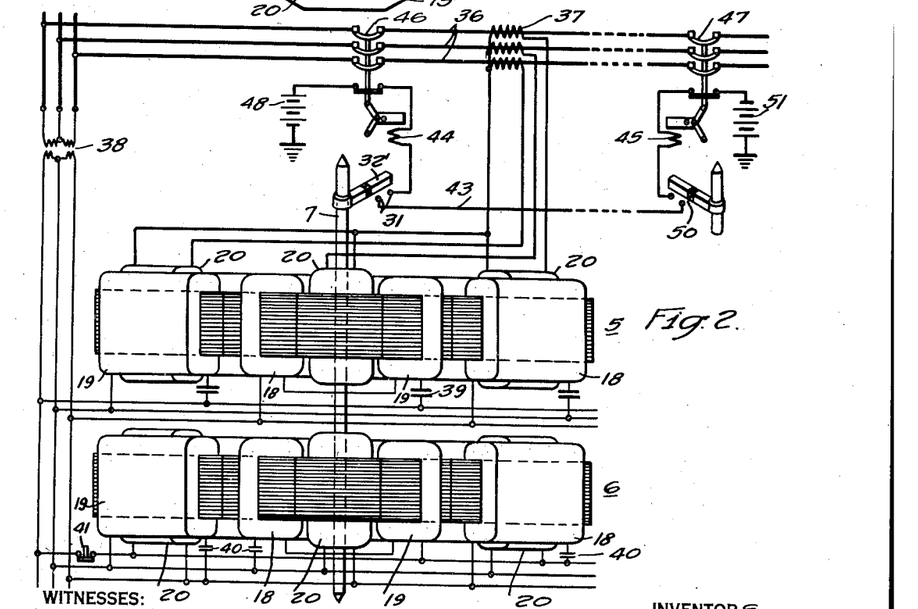
Fig. 2 is a side elevational view of the essential parts of a voltage-restrained polyphase directional element embodying our invention, with the relay-contacts and the relay-pivots diagrammatically indicated, and with a diagrammatic wiring diagram of other apparatus and circuits embodying our invention in an illustrative form of embodiment.

In the form of our invention shown in Figs. 1 and 2, we have provided a voltage-restraint polyphase directional element consisting of an upper three-phase wattmeter-element 5 for obtaining the polyphase directional response, and a lower three-phase wattmeter-element 6 for obtaining a non-pulsatory voltage-responsive restraining force. The relay has a common shaft 7 which carries the rotating members of both of the polyphase wattmeter-elements. The two polyphase wattmeter-elements 5 and 6 are similar so that a description of one will suffice for both.

As shown more clearly in the plan view of Fig. 1, the top polyphase wattmeter-element 5 comprises three loop-type, laminated, magnetizable, electromagnet-cores 8, 9 and 10, stationarily supported in a common plane and in spaced relation about the shaft 7. Each of the electromagnet-cores, such as the core 10, has two side-legs 12, and 13, two yokes 14 and 15, and a reentrant center-leg 16 which extends from the midpoint of the rear yoke 15 to an air-gap 17 between the midpoint of the front yoke 14 and the front end of said reentrant leg 16, the front yoke 14 being the one which is closest to the shaft 7. The two side-legs 12 and 13 are energized by means of two voltage-coils 18 and 19 which are connected so as to send a flux, loop-fashion, around the magnetic circuit composed of the two side-legs 12 and 13 and the two yokes 14 and 15.

The centrally-disposed reentrant leg 16 is excited by a current-coil 20, and in accordance with our invention, this current-coil is disposed on the extreme rear end of the center leg 16, close up against the rear yoke 15, and the center leg 16 is made quite long, so that the front end 22 of the current-coil 20 is spaced a considerable distance back from the air-gap 17, the purpose of this construction being to increase the magnetic leakage, particularly under high current-conditions, at which time the center leg 16 is saturated. In accordance with our invention, we also make the center leg 16 very narrow, in a circumferential direction with respect to the shaft 7, for a purpose which will be subsequently explained.

The three stationary electromagnet-cores 8, 9 and 10 cooperate with three aluminum inductor-loops 24, 25 and 26, respectively, each loop being threaded by the front yoke 14 of its electromagnet-core. Each of the inductor-loops has a thin front-leg 27 which is disposed within the air-gap 17 of its corresponding electromagnet-core, and a thick rear-leg 28 which is mounted on, or integral with, the shaft 7.

The shaft 7 also carries a movable contact-member 30 which cooperates with a stationary contact-member 31. Preferably, the movable contact-member 30 terminates in a tungsten-powder-filled conducting capsule 32 which dampens bouncing, by reason of the movement of the sharp-edged tungsten-powder granules over each other, as shown and described in an application of W. V. Johnson, Serial No. 352,915, filed August 16, 1940, and assigned to the Westinghouse Electric & Manufacturing Company. The non-bouncing contact 32 is shown in Fig. 1, because that is the construction which we prefer. It should be understood, however, that, so far as our present invention is concerned, any form of movable-contact member could be utilized, as broadly indicated at 32' in Fig. 2.

It is an important feature of our present invention that the front yokes 14 of each of the three electromagnet-cores 8, 9 and 10 are humped at their midpoints, where they project toward the shaft 7. This humped construction has two important advantages. In the first place, it enormously increases the distance between adjacent electromagnet-cores, as indicated at 34. In the second place, it produces a voltage-responsive de-centering-torque which will subsequently be described more in detail.

In Fig. 2, we show an illustrative wiring diagram of connections whereby the top polyphase wattmeter element 5 is energized to be responsive to polyphase power-direction of a three-phase line 36 which is to be protected; while the bottom polyphase wattmeter element is energized so as to produce a non-pulsating restraining-torque responsive to the square of the polyphase line-voltages. The three current-coils 20 of the top polyphase wattmeter element 5 are energized with relaying currents which are derived from, and responsive to, the respective line-currents in the three conductors of the protected line 36, the relaying currents being derived by means of three star-connected current-transformers 37. The three pairs of voltage-coils 18 and 19 of the three electromagnets of the top polyphase wattmeter element 5 are energized from different delta relaying voltages which are derived from the line 36 through potential transformers 38. The two voltage-coils 18 and 19 of each electromagnet-core are preferably connected in series with each other, and in series with a phase-shifting impedance in the form of a capacitor 39, as indicated in Fig. 2, and each pair of voltage-coils is energized from the delta-phase opposite to the star-current with which the corresponding current-coil 20 is energized, thus utilizing what is known as the 90° connection.

The impedance of each of the voltage-coils 18 and 19 is mostly resistance, so that the fluxes which circulate, loop fashion, around each electromagnet-core, that is, through the two outer legs 12 and 13 and through the two yokes 14 and 15, are practically in phase with the voltage impressed upon the two voltage-coils 18 and 19. Each of the inductor-loops 24, 25 and 26 has a sufficiently low effective cross-section (with respect to currents circulated within said loop) so that the loop has a relatively low reactance as compared to its resistance, so that the loop-current lags behind the voltage applied to the voltage-coils 18 and 19 of its electromagnet-core by a small angle of the order of 15°. The flux in the air-gap 17 of each electromagnet-core, such as the core 10 in Fig. 1, is, of course, in phase with the current in the current-coil 20 of the said electromagnet-core. The response of each of the single-phase wattmeter elements is to the product of the loop-current times the air-gap flux, multiplied by the cosine of the phase-angle between these two quantities. Consequently, the maximum torque of each of the single-phase wattmeter elements, as thus far specifically described, is produced when the current which is supplied to the current-coil 20 lags the voltage which is impressed upon the voltage-coils 18 and 19 by about 15°. By adding the proper size of series capacitor 39 to the voltage-coil circuit, maximum torque can be obtained with the relay-current leading the voltage impressed upon the entire voltage-circuit, by 45°.

We commonly use the 90° connection, in which the current-coil is energized from a "phase" or "star" line-current, while the voltage-coil circuit is energized from the opposite delta voltage in such polarity that the voltage lags the current by 90° when the power-factor of the line or system is unity. Hence, with a 45° relay-characteristic and a 90° connection, maximum torque is obtained when the system fault-current is lagging by 45°. We normally use this 90° connection, with our polyphase directional relays, because such relays give faster and more sensitive operation during phase-to-phase faults, because the two single-phase elements in which the fault-currents are flowing are excited with unfaulted (and hence undiminished) delta-voltages.

As shown in Fig. 2, the three single-phase wattmeter-elements of the lower polyphase member 6 are energized with both their so-called current-coils 20 and their so-called voltage-coils 18 and 19, energized from different phases of the line-voltage, through the potential transformers 38. While the term "current-coil" is retained, for convenience of expression, to indicate the coil other than the "voltage coils," it will be understood that, since the so-called "current coils" of the lower polyphase wattmeter-element 6 of Fig. 2 are energized from a voltage-circuit, rather than from a current-circuit, they will be wound with a large number of turns of relatively fine wire instead of a small number of turns of relatively heavy wire, as in the case of a current energized coil.

For our voltage-restraint, as shown in Fig. 2, the voltage and "current" coils of the respective electromagnets are energized from different pairs of delta voltages, so that the single-phase pulsating torques of the three different electromagnets are out of phase with each other, so that steady, non-pulsating resultant torque is produced under balanced voltage-conditions. In each electromagnet, the voltage-coils, or outer-leg coils 18 and 19, are energized from one delta voltage, and the "current-coil," or center-leg coil, is energized, in reversed polarity, from another delta voltage, so that its phase is 60° in advance of the phase of the voltage-coils under balanced conditions. It is usually desirable to utilize serially connected capacitors 40 in series with the voltage coils so that the voltage-restraint will be in response to the sine of the phase-angle between the two relaying voltages of each electromagnet.

The lower polyphase wattmeter-element 6 of Fig. 2 produces a voltage-responsive restraint which is proportional to the square of the voltage. During three-phase faults, this voltage-responsive restraint becomes quite negligible, because of the small value of the line-voltage during such three-phase fault conditions. During an unbalanced or single-phase fault, the restraint becomes zero if the delta voltage of the faulted phase is reduced to zero, because one of the applied voltages becomes zero on two of the electromagnets, while the other electromagnet has a zero angle between the two collapsed unfaulted voltages.

With the particular form of polyphase voltage-restraint which we have utilized in the lower part of our Fig. 2 embodiment, it becomes extremely simple to remove voltage-restraint by opening any one supply-lead which supplies the three-phase relaying-voltages to the voltage-restraint element. This has been indicated, in Fig. 2, by means of a switching-element 41, which may be either manually controlled or relay-operated, as by means of suitable fault-detectors, as is known in the art.

The relaying equipment which has been illustrated and described in connection with Figs. 1 and 2 is useful in many different ways. By way of illustration, we have indicated, in Fig. 2, one use of our apparatus, involving a direct-current pilot-wire 43 for joining the two ends of a three-phase transmission-line section 36 which is to be protected, so as to control the energization of the trip-coils 44 and 45 of the line-circuit-breakers 46 and 47 at the respective ends of the protected line-section. The relay-contacts 31—32' are connected in series with the pilot-wire 43 at one end thereof, in series with the trip-coil 44 and a station-battery 48 at that end of the protected line-section 36. At the other end, a similar relay-contact member 50 is serially connected to the pilot-wire 43, in series with the trip-coil 45, and the station-battery 51 at that end of the protected line-section 36. One of the station-batteries has its negative terminal grounded, while the other has its positive terminal grounded, so that, when a fault occurs anywhere within the protected line-section 36, the two directional relay-contacts (31—32' at one end, and 50 at the other end), will close, each in response to a power-direction of current flowing into the faulted line-section from its respective end. The direct-current pilot-wire 43 is thus energized only when the power-direction is internal, or in-flowing, at both ends of the protected line-section. For a fault outside of the protected line-section, only one of the directional relays responds, so that the pilot-wire circuit 43 is not energized.

In the operation of our system as shown in Figs. 1 and 2, we have already explained how the upper polyphase wattmeter-element 5, in Fig. 2, develops three single-phase directional responses dependent upon the directions of the three line-currents, while the lower polyphase wattmeter-element 6 develops a voltage-responsive torque which is steady and non-pulsatory during balanced three-phase line-voltage conditions, and which automatically becomes zero when any one or more of the line-voltages is reduced to zero as a result of either a single-phase or a multiphase fault.

In high-speed directional relays, the critical design-limitation is imposed by the necessity for avoiding excessive relay-chattering during the severest fault-current conditions. Such severe fault-currents are usually obtained with three-phase faults which are the severest faults to which a system can be subjected. In our system, the three-phase fault-condition presents no problem as to relay-chattering, because the single-phase torque-pulsations of the three single-phase directional elements are all of equal magnitude and 120 electrical degrees displaced from each other, so that a steady or non-pulsatory directional torque is obtained. Under unbalanced or single-phase fault-conditions, our polyphase directional element produces a pulsatory torque, and our relay must be designed with sufficient inertia of its rotor-member to operate satisfactorily under these conditions, but these conditions are not as severe as the conditions which are imposed, in general, as a result of polyphase faults, in previous relaying systems in which the torques resulting from the polyphase faults were not added together on the same shaft, to produce a steady-state or non-pulsatory torque.

It will be understood by those who are familiar with relaying systems that we have very much simplified our diagram of connections, in Fig. 2, said figure omitting the usual contactor-switches which we actually utilize to by-pass the sensitive relay-contacts so as to relieve said relay-contacts of the burden of interrupting the tripping-circuit.

A distinctive novel feature of our system as shown in Figs. 1 and 2 is to be discovered in the construction of the polyphase wattmeter-element itself. Referring to the plan view in Fig. 1, it will be noted that the bulged shape of the front yoke 14 of each of the electromagnet-cores results in bringing the inside surfaces of this front yoke out of alignment with each other, as indicated at 53 and 54, on opposite sides of the midpoint of the said front yoke 14, and on the inside of said yoke-member, that is, on the side toward the air-gap 17. Thus, as explained in the introductory portion of our specification, when the inductor-loop 24, 25 or 26 is displaced from its illustrated central position, in either direction, the air-gap leg 27 of the loop moves up closer to either the iron surface 53 or the iron surface 54, dependent upon the direction of movement, thereby becoming attracted to said iron surface and producing a force tending to move the inductor-loop still further away from its center position. In our design, we utilize this force to oppose the so-called "centering" force which is exerted by the air-gap flux on the inductor-loop 26 whenever said loop is displaced from its illustrated central position, said "centering" torque being produced by the component of current which is induced in the loop as a result of the threading of the loop by the alternating air-gap flux whenever the loop is displaced out of its illustrated midpoint position.

The loop-decentering torque, which is produced by the attraction between the loop-current in the air-gap leg 27 of the loop and the inner surface 53 or 54 of the bulged front yoke 14, is proportional, in magnitude, to the loop-current, which, in turn, is proportional to the voltage applied to the voltage-coils 18 and 19, so that we thus produce a small voltage-responsive decentering-torque which we utilize to oppose the current-responsive centering-torque resulting from the air-gap flux, which is, in turn, responsive to the current flowing in the current-coil 20.

By making the front pole-face of our intermediate or reentrant current-leg 16 narrow, as measured in the direction of movement of the inductor-loop 26, we enhance the above-described voltage-responsive decentering torque by having the air-gap leg 27 of the loop move away from the current-leg iron and approach the yoke-member surface 53 or 54, as the case may be.

Another important feature of our construction, as intimated in the preliminary outline of objects, is our utilization of an unusually long reentrant or current-energized center-leg 16, and an unusually short current-coil 20 which is placed thereon at the extreme rear end thereof, so as to leave a large portion of the current-leg 16 uncovered, between the front end 22 of the current-coil 20 and the air-gap 17. The restricted cross-section of the current-energized reentrant leg 16 produces saturation under heavy-current conditions. The remote rearward position of the current-coil 20, coupled with the saturation-effect, results in producing a rather substantial leakage-flux which passes directly from the uncovered portion of the current-leg 16 to the two outer legs 12 and 13 of the electromagnet-core, without passing at all through the air-gap 17, under heavy or excessive current-conditions, thus preventing the development of an excessive current-responsive, or air-gap-flux-responsive, centering torque on the movable inductor-loop 24, 25 or 26. In the above-described way, we remove an important limitation which has heretofore handicapped directional-element designs utilizing the inductor-loop principle.

The advantages just pointed out have to do primarily with the operation of each single-phase directional element 8, 9 or 10 by itself.

In regard to the polyphase feature of our relay, or the feature of utilizing a plurality of single-phase electromagnets disposed in a common plane around, and spaced from, a common shaft, the bulged shape of the front yokes 14 again becomes significantly important, because this bending away of the front yokes, away from the central points thereof which come closest to the shaft, results in very materially increasing the spacing between adjacent electromagnets, as indicated at 34 in Fig. 1. This increased spacing between the electromagnets of different phases results in a considerable reduction in the leakage-flux which escapes from one electromagnet to another. As previously explained in the early portions of this specification, the necessity for avoiding such leakage-flux from one electromagnet to another is one of the important features of our present discovery or invention, because, according to our view or theory of the performance, substantiated by actual tests made on our apparatus, we believe that whenever such leakage-flux exists to any material extent, there will be produced a rotating three-phase field, which tends to produce a similar rotation of the rotor-member of the relay, regardless of any directional torques which may be produced by the reactions of currents and voltages.

At any time when the directionally responsive torques are substantial, this rotating-field flux is negligibly small. It is only when the directional fluxes are feeble that the rotational-field torque, which we believe due to the leakage-fluxes, enters seriously into the operation of the relays as a whole. The most serious situation, from this standpoint, occurs at times of a severe three-phase fault which may produce very large relaying currents, accompanied by very small line-voltages and relaying-voltages. Because of the small voltages, the products of current and voltage, which determine direction when multiplied by the cosine of the angle between them, will be small, but at these times the currents are large. The rotating-field torque due to the voltage-flux is never troublesome at times of fault-conditions, because the line-voltages are always reduced, not increased, under these conditions.

In our construction, our current-coils are not only surrounded by the loop-type electromagnet frame, which provides a complete iron path or loop consisting of the two outer-legs 12 and 13 and the front and back yokes 14 and 15, but our current-coils 20 are also placed far back on the center-leg 16, as far away from the rotor-member as possible. Furthermore, the several electromagnet-cores are spaced far apart from each other, as indicated at 34, by reason of the bulging shape of the front yokes 14, so that that portion of the current flux which finds a return-path in the electromagnet loop-type core does not readily leak or escape from one core to the next adjacent core, because of said wide spacing 34. In this manner, we have very materially reduced our rotating-field effect due to the presence of heavy three-phase fault-currents, so much so that this effect is no longer significant in the operation of the relay.

By reversing the connections for both the current-coil and the voltage coils of any one of the three electromagnets, we produce watt-torque in the same direction as before, in the specific electromagnet in question, but we eliminate the small rotating-field torque which would otherwise be present due to the large polyphase currents flowing during three-phase faults.

Figure 3:
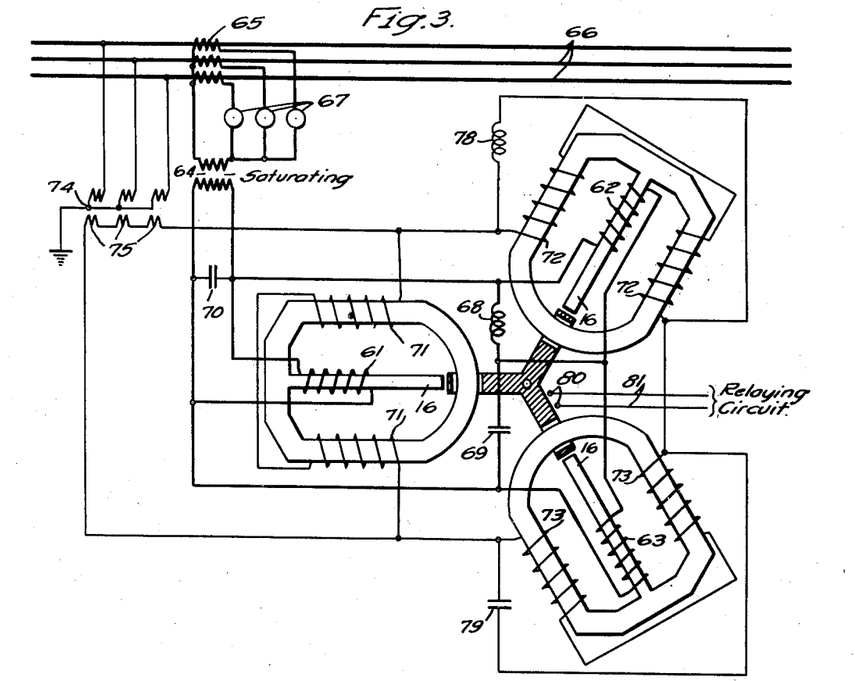
Fig. 3 is a diagrammatic plan-view of circuits and apparatus utilizing a three-phase embodiment of our invention as a ground-directional element.

In Fig. 3, we show an important application of our polyphase directional element in securing a ground-fault directional response which is non-pulsatory, and which, because it is non-pulsatory, can be embodied in a low-inertia relay which responds as quickly as may be required of it, without the danger of introducing any chattering difficulties. The production of a non-pulsatory ground-current-responsive directional torque also enormously facilitates the embodiment of a ground-directional element in the same unit with a polyphase or phase-directional element, in a manner similar to the manner in which the voltage-restraint element 6 was combined with the polyphase directional element 5 in Fig. 2.

In Fig. 3, we show a polyphase wattmeter-element which is structurally similar to that which has already been shown and described in connection with Figs. 1 and 2. The energizations of the current and voltage-coils, in Fig. 3, are different, however. In Fig. 3, the three current-coils 61, 62 and 63 are energized from an auxiliary saturating current-transformer 64 which is connected in the star-point connection, or residual-current connection, of a bank of star-connected line-current transformers 65 which are energized from the line 66 to be protected, said line-current transformer being utilized to energize line-current-responsive devices which are symbolically indicated by circles 67, as well as energizing the aforesaid residual-current or ground-current transformer 64.

One of the current-coils 61 of our ground-directional relay in Fig. 3 is directly energized across the terminals of the auxiliary residual-current transformer 64. The other two current-coils 62 and 63 are energized in a parallel-connected circuit in series with each other, and energized from the same residual current-transformer 64, and suitable phase-modifying means are utilized to cause the currents in the three current-coils 61, 62 and 63 to be substantially equal in magnitude and displaced 120 electrical degrees from each other, so as to provide a substantially balanced three-phase system of currents. A number of phase-transforming means are available, for obtaining polyphase currents from a single-phase current-source such as the residual-current transformer 64, the illustrated phase-transforming means which is illustrated in Fig. 3 being one of the best, and comprising an inductor or choke coil 68 connected in shunt-circuit relation to the current-coil 62, and a capacitor 69 connected in shunt-circuit relation to the current-coil 63.

The magnitudes of these inductive and capacitive reactors 68 and 69, and the relative numbers of turns on the respective coils 61, 62 and 63, can readily be chosen so that the above-described balanced symmetrical conditions may be obtained. By a proper design of the current-coil 62, its impedance-angle may be made 60°, so that its shunt-connected reactor 68 will not be needed. If the impedance-angle of the coil 62 is less than 60°, corresponding more nearly to a pure resistance, the inductor 68 is needed as shown. If the impedance-angle of the coil 62 is greater than 60°, a small capacitor would have to be used in place of the inductor 68.

The residual-current transformer 64 may be so designed that it saturates at moderate values of the line-current, and before saturation is obtained in the current-coils 61, 62 and 63 of the several single-phase directional elements. This utilization of a saturating current-transformer 64 as the primary source of single-phase current for energizing the three polyphase-related current-coils 61, 62 and 63 is particularly advantageous, because of the prevention of saturation of the current energized center-legs 16 of the electromagnets, in connection with the illustrated form of phase-transforming means utilizing the shunting reactors 68 and 69, because the values of these reactors are adjusted, of course, to the unsaturated values of the impedances of the current-coils 62 and 63, respectively.

It is frequently desirable, as also shown in Fig. 3, to utilize a voltage-limiting capacitor 70 which is shunted across the terminals of the auxiliary current-transformer 64 for the purpose of limiting the peak voltage or current-surge during the instant when the current-transformer 64 is first energized, particularly when that instant occurs at or near the time of the peak of the wave of the residual line-voltage.

In Fig. 3, the three pairs of voltage-coils 71, 72 and 73 are energized from a source of single-phase zero-phase-sequence voltage which is obtained from a bank of potential transformers 74 which are energized from the line 66 which are provided with open-delta secondary-windings 75. The same phase-modifying means is utilized for the voltage-coils in Fig. 3, as for the current-coils, namely, energizing the pair of voltage-coils 71 of our electromagnet directly across the transformer-secondaries 75, and energizing the other voltage-coils 72 and 73 in series with each other in a shunt circuit, from the same secondary windings 75, with the voltage-coils 72 shunted by an inductor 78, and with the voltage-coils 73 shunted by a capacitor 79.

The polyphase directional relay shown in Fig. 3 is indicated as having relay-contacts 80 which are utilized to energize a suitable relaying circuit indicated at 81.

In operation, the polyphase directional element of Fig. 3 utilizes a single-phase source of current, and a single-phase source of voltage, to secure a polyphase directional response which is non-pulsating in character, the pulsations of the several single-phase torques canceling each other and producing a smooth or non-pulsatory resultant-torque.

Figure 4:
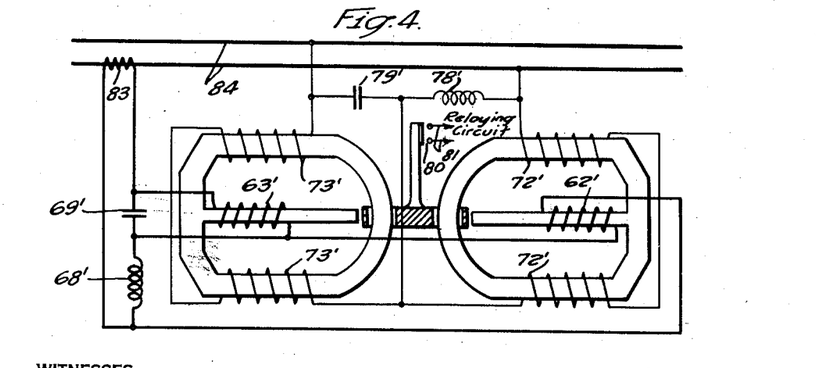
Fig. 4 is a similar view of a two-phase embodiment of our invention connected so as to obtain a non-pulsatory response to a single-phase voltage and a single-phase current.

The same result as obtained in Fig. 3 could be obtained with only two single-phase wattmeter-elements, as shown in Fig. 4, if the values of the shunting reactors 68', 69', 78' and 79' are so chosen as to produce a 90° phase-relation between the two currents and the two voltages. Thus, in Fig. 4, one of the electromagnet-cores is provided with a current-coil 62' and a pair of voltage-coils 72', whereas the other electromagnet-core is provided with a current-coil 63' and a pair of voltage-coils 73'. The current-coils 62' and 63' are represented, in Fig. 4, as being energized from a line-current transformer 83 which is energized from a single-phase line 84 to be protected, while the voltage-coils 72' and 73' are represented as being directly connected across the single-phase line 84.

While we have illustrated our invention in several different alternative forms of embodiment, we desire it to be understood that our invention is not limited to the particular illustrated forms, as various changes, by way of addition, omission and substitution, may be made by those skilled in the art without departing from the essential spirit of our invention. We desire, therefore, that the appended claims shall be accorded the broadest construction consistent with their language.

We claim as our invention:

1. A wattmeter-type relay comprising a rotatably supported contact-controlling member, a loop-type electromagnet-core having two side-legs and two yokes joining the respective ends of the side-legs, the front yoke of said core, adjacent to the axis of said rotatably supported member, being humped at its midpoint which projects toward said axis, said electromagnet-core further having a reentrant leg extending from the midpoint of the rear yoke to an air-gap between the midpoint of the front yoke and the front end of said reentrant leg, said rotatably supported member comprising an inductor-loop having one side in the air-gap of said electromagnet-core, electromagnet-coil-means for respectively energizing the side-legs and the reentrant leg of the electromagnet-core, the side-leg-energizing magnet-coil-means of the electromagnet being adapted to circulate a flux in loop-fashion around the core, and alternating-current means for energizing the respective side-leg-energizing and reentrant-leg-energizing magnet-coil-means with two different alternating-current quantities so that said inductor-loop develops a pulsating single-phase wattmeter-type torque.

2. A wattmeter-type relay comprising a rotatably supported contact-controlling member, a plurality of loop-type electromagnet-cores stationarily supported in a common plane and in spaced relation about the axis of said rotatably supported member, each electromagnet core having two side-legs and two yokes joining the respective ends of the side-legs, the front yoke of each core, adjacent to said axis, being humped at its midpoint which projects toward said axis, each electromagnet-core further having a reentrant leg extending from the midpoint of the rear yoke to an air-gap between the midpoint of the front yoke and the front end of said reentrant leg, said rotatably supported member comprising a plurality of inductor-loops, each loop having one side in the air-gap of one of the electromagnet-cores, a plurality of sets of electromagnet-coil-means for respectively energizing the side-legs and the reentrant leg of each of the respective electromagnet-cores, the side-leg-energizing magnet-coil-means of the respective electromagnets being adapted to circulate a flux in loop-fashion around their cores, and out-of-phase alternating-current means for energizing the respective side-leg-energizing magnet-coil-means and the respective reentrant-leg-energizing magnet-coil-means of the electromagnets with different out-of-phase quantities so that each inductor-loop develops a pulsating single-phase wattmeter-type torque responsive to the product of the two energizing quantities for the respective side-leg-energizing and re-entrant-leg-energizing magnet-coil-means of its electromagnet, multiplied by a function of the phase-angle between said two quantities, the pulsating single-phase torques being at times out of phase with each other in such manner as to produce a non-pulsating resultant torque under balanced conditions.

3. A wattmeter-type relay comprising a rotatably supported contact-controlling member, three loop-type electromagnet-cores stationarily supported in a common plane and in spaced relation about the axis of said rotatably supported member, each electromagnet-core having two side-legs and two yokes joining the respective ends of the side-legs, the front yoke of each core, adjacent to said axis, being humped at its midpoint which projects toward said axis, each electromagnet-core further having a reentrant leg extending from the midpoint of the rear yoke to an air-gap between the midpoint of the front yoke and the front end of said reentrant leg, said rotatably supported member comprising three inductor-loops, each loop having one side in the air-gap of one of the electromagnet-cores, a plurality of electromagnet-coil-means for respectively energizing the side-legs and the reentrant leg of each of the respective electromagnet-cores, the side-leg-energizing magnet-coil-means of the respective electromagnets being adapted to circulate a flux in loop-fashion around their cores, and three-phase means for energizing the respective side-leg-energizing magnet-coil-means and the respective reentrant-leg-energizing magnet-coil-means of the three electromagnets with three-phase quantities so that each inductor-loop develops a pulsating single-phase wattmeter-type torque responsive to the product of the two energizing quantities for the respective side-leg-energizing and reentrant-leg-energizing magnet-coil-means of its electromagnet, multiplied by a function of the phase-angle between said two quantities.

4. A wattmeter-type relay comprising a rotatably supported contact-controlling member, a loop-type electromagnet-core having two side-legs and two yokes joining the respective ends of the side-legs, said electromagnet-core further having a reentrant leg extending from the midpoint of the rear yoke to an air-gap between the midpoint of the front yoke and the front end of said reentrant leg, said front yoke being adjacent to the axis of said rotatably supported member, the rear side of said front yoke, at the midpoint thereof at the aforesaid air-gap, being bulged away from said reentrant leg so as to have non-aligned surfaces on opposite sides of said midpoint at said air-gap, said rotatably supported member comprising an inductor-loop having one side in said air-gap, electromagnet-coil-means for respectively energizing the side-legs and the reentrant leg of the electromagnet-core, the side-leg-energizing magnet-coil-means of the electromagnet being adapted to circulate a flux in loop-fashion around the core, the reentrant-leg-energizing magnet-coil-means being disposed on the rear portion of said reentrant leg so that the front end of said magnet-coil-means is spaced back from the front end of said reentrant leg whereby to provide a leakage-flux path, in front of said reentrant-leg magnet-coil-means, from the front portion of said reentrant leg to the respective side-legs of the electromagnet-core, at least the front end of said reentrant leg, adjacent to the air-gap, being of a narrow width and of a sufficiently small cross-section to become saturated during high-current exciting-conditions of said reentrant-leg magnet-coil-means, whereby to increase said leakage flux, and alternating-current means for energizing the respective side-leg-energizing and reentrant-leg-energizing magnet-coil-means with two different alternating-current quantities so that said inductor-loop develops a pulsating single-phase wattmeter-type torque.

5. A wattmeter-type relay comprising a rotatably supported contact-controlling member, a plurality of loop-type electromagnet-cores stationarily supported in a common plane and in spaced relation about the axis of said rotatably supported member, each electromagnet-core having two side-legs and two yokes joining the respective ends of the side-legs, each electromagnet-core further having a reentrant leg extending from the midpoint of the rear yoke to an air-gap between the midpoint of the front yoke and the front end of said reentrant leg, the front yokes of the plurality of electromagnet-cores being adjacent to said axis, the rear side of each front yoke, at its midpoint at its air-gap, being bulged away from the reentrant leg of its electromagnet-core so as to have non-aligned surfaces on opposite sides of said midpoint at said air-gap, said rotatably supported member comprising a plurality of inductor-loops, each loop having one side in the air-gap of one of the electromagnet-cores, a plurality of electromagnet-coil-means for respectively energizing the side-legs and the reentrant leg of each of the respective electromagnet-cores, the side-leg-energizing magnet-coil-means of the respective electromagnets being adapted to circulate a flux in loop-fashion around their cores, the reentrant-leg-energizing magnet-coil-means of each electromagnet being disposed on the rear portion of said reentrant leg so that the front end of said magnet-coil-means is spaced back from the front end of said reentrant leg whereby to provide a leakage-flux path, in front of said reentrant-leg magnet-coil-means, from the front portion of said reentrant leg to the respective side-legs of the electromagnet-core, at least the front end of each reentrant leg, adjacent to the air-gap, being of a narrow width and of a sufficiently small cross-section to become saturated during high-current exciting-conditions of said reentrant-leg magnet-coil-means, whereby to increase said leakage flux, and out-of-phase alternating-current means for energizing the respective side-leg-energizing magnet-coil-means and the respective reentrant-leg-energizing magnet-coil-means electromagnets with different out-of-phase quantities so that each inductor-loop develops a pulsating single-phase wattmeter-type torque responsive to the product of the two energizing quantities for the respective side-leg and reentrant-leg magnet-coil-means of its electromagnet, multiplied by a function of the phase-angle between said two quantities, the pulsating single-phase torque being at times out of phase with each other in such manner as to produce a non-pulsating resultant torque under balanced conditions.

6. The invention as defined in claim 3, characterized by the reentrant-leg-energizing magnet-coil-means of each electromagnet being disposed on the rear portion of its reentrant leg so that the front end of said magnet-coil-means is spaced back from the front end of said reentrant leg whereby to provide a leakage-flux path, in front of said reentrant-leg magnet-coil-means, from the front portion of said reentrant leg to the respective side-legs of the electromagnet-core, at least the front end of each reentrant leg, adjacent to the air-gap, being of a narrow width and of a sufficiently small cross-section to become saturated during high-current exciting-conditions of said reentrant-leg magnet-coil-means, whereby to increase said leakage flux.

7. The invention as defined in claim 2, characterized by the out-of-phase energizing-means comprising two separate means for obtaining two differently derived sets of out-of-phase relaying quantities from an electrical device to be protected, and circuit means for utilizing one phase of each of said two differently derived sets of quantities to excite the respective magnet-coil-means of each electromagnet, whereby a single-phase directional response is obtained in each electromagnet.

8. The invention as defined in claim 3, characterized by the three-phase energizing-means comprising two separate means for obtaining two differently derived sets of three-phase relaying quantities from a three-phase electrical device to be protected, and circuit-means for utilizing one phase of each of said two differently derived sets of quantities to excite the respective magnet-coil-means of each electromagnet, whereby a single-phase directional response is obtained in each electromagnet.

9. The invention as defined in claim 2, characterized by the out-of-phase energizing-means comprising means for obtaining a set of out-of-phase relaying quantities from an electrical device to be protected, and circuit-means for utilizing a different pair of out-of-phase quantities of said set to excite the respective magnet-coil-means of each electromagnet, whereby a plurality of out-of-phase single-phase responses are obtained in the respective electromagnets.

10. The invention as defined in claim 3, characterized by the three-phase energizing-means comprising means for obtaining a set of three-phase relaying quantities from a three-phase electrical device to be protected, and circuit-means for utilizing a different pair of out-of-phase quantities of said set to excite the respective magnet-coil-means of each electromagnet, whereby a plurality of out-of-phase single-phase responses are obtained in the respective electromagnets.

11. The invention as defined in claim 2, characterized by the out-of-phase energizing-means comprising two separate means for obtaining two differently derived single-phase relaying quantities from an electrical device to be protected, phase-modifying means energized with the respective differently derived single-phase relaying quantities for in effect obtaining two differently derived sets of out-of-phase relaying quantities, and circuit-means for utilizing one phase of each of said two differently derived sets of quantities to excite the respective magnet-coil means of each electromagnet, whereby a single-phase directional response is obtained in each electromagnet.

12. The invention as defined in claim 3, characterized by the three-phase energizing-means comprising two separate means for obtaining two differently derived single-phase relaying quantities from an electrical device to be protected, phase-modifying means energized with the respective differently derived single-phase relaying quantities for in effect obtaining two differently derived sets of three-phase relaying quantities, and circuit-means for utilizing one phase of each of said two differently derived sets of quantities to excite the respective magnet-coil-means of each electromagnet whereby a single-phase directional response is obtained in each electromagnet.

13. The invention as defined in claim 2, characterized by the out-of-phase energizing-means comprising a three-conductor relaying source of a set of out-of-phase relaying quantities to which a response is to be obtained, circuit-means for utilizing a different pair of out-of-phase quantities of said set to excite the respective magnet-coil-means of each electromagnet, whereby a plurality of out-of-phase single-phase responses are obtained in the respective electromagnets, and means for in effect at times open-circuiting one of the three conductors of the relaying source.

14. The invention as defined in claim 3, characterized by the three-phase energizing-means comprising a three-conductor relaying source of a set of three-phase relaying quantities to which a response is to be obtained, circuit-means for utilizing a different pair of out-of-phase quantities of said set to excite the respective magnet-coil-means of each electromagnet, whereby a plurality of out-of-phase single-phase responses are obtained in the respective electromagnets, and means for in effect at times open-circuiting one of the three conductors of the relaying source.

15. A wattmeter-type relay comprising a rotatably supported contact-controlling member, a plurality of fixedly supported single-phase wattmeter elements operating on said rotatably supported contact-controlling member in such manner as to develop as many pulsating single-phase torques therein, each single-phase wattmeter element having two different coils for developing a wattmeter-type torque responsive to the product of the two energizing quantities for the respective coils, multiplied by a function of the phase-angle between said two quantities, and out-of-phase alternating-current energizing-means for energizing the respective coils of the respective wattmeter elements in such manner that the pulsating single-phase torques are at times out of phase with each other so as to produce a non-pulsating resultant torque under balanced conditions, said out-of-phase energizing-means comprising means for obtaining a set of out-of-phase relaying quantities from an electrical device to be protected, and circuit-means for utilizing a different pair of out-of-phase quantities of said set to excite the respective coils of each wattmeter element, whereby a plurality of out-of-phase single-phase responses are obtained in the respective wattmeter elements.

16. A wattmeter-type relay comprising a rotatably supported contact-controlling member, three fixedly supported single-phase wattmeter elements operating on said rotatably supported contact-controlling member in such manner as to develop three pulsating single-phase torques therein, each single-phase wattmeter element having two different coils for developing a wattmeter-type torque responsive to the product of the two energizing quantities for the respective coils, multiplied by a function of the phase-angle between said two quantities, and three-phase alternating current energizing-means for energizing the respective coils of the respective wattmeter elements, said three-phase energizing-means comprising means for obtaining a set of three-phase relaying quantities from the different phases of a three-phase electrical device to be protected, and circuit-means for utilizing a different pair of out-of-phase quantities of said set to excite the respective coils of each wattmeter element, whereby a plurality of out-of-phase single-phase responses are obtained in the respective wattmeter elements.

17. A wattmeter-type relay comprising a rotatably supported contact-controlling member, a plurality of fixedly supported single-phase wattmeter elements operating on said rotatably supported contact-controlling member in such manner as to develop as many pulsating single-phase torques therein, each single-phase wattmeter element having two different coils for developing a wattmeter-type torque responsive to the product of the two energizing quantities for the respective coils, multiplied by a function of the phase-angle between said two quantities, and out-of-phase alternating-current energizing-means for energizing the respective coils of the respective wattmeter elements in such manner that the pulsating single-phase torques are at times out of phase with each other so as to produce a non-pulsating resultant torque under balanced conditions, said out-of-phase energizing-means comprising means for obtaining two differently derived single-phase relaying quantities from an electrical device to be protected, phase-modifying means energized with the respective differently derived single-phase relaying quantities for in effect obtaining two differently derived sets of out-of-phase relaying quantities, and circuit-means for utilizing one phase of each of said two differently derived sets of quantities to excite the respective coils of each wattmeter element, whereby a single-phase directional response is obtained in each wattmeter element.

18. A wattmeter-type relay comprising a rotatably supported contact-controlling member, three fixedly supported single-phase wattmeter elements operating on said rotatably supported contact-controlling member in such manner as to develop three pulsating single-phase torques therein, each single-phase wattmeter element having two different coils for developing a wattmeter-type torque responsive to the product of the two energizing quantities for the respective coils, multiplied by a function of the phase-angle between said two quantities, and three-phase alternating-current energizing-means for energizing the respective coils of the respective wattmeter elements, said three-phase energizing-means comprising means for obtaining two differently derived single-phase relaying quantities from an electrical device to be protected, phase-modifying means energized with the respective differently derived single-phase relaying quantities for in effect obtaining two differently derived sets of three-phase relaying quantities, and circuit-means for utilizing one phase of each of said two differently derived sets of quantities to excite the respective coils of each wattmeter element, whereby a single-phase directional response is obtained in each wattmeter element.

19. A wattmeter-type relay comprising a rotatably supported contact-controlling member, a plurality of fixedly supported single-phase wattmeter elements operating on said rotatably supported contact-controlling member in such manner as to develop as many pulsating single-phase torques therein, each single-phase wattmeter element having two different coils for developing a wattmeter-type torque responsive to the product of the two energizing quantities for the respective coils, multiplied by a function of the phase-angle between said two quantities, and out-of-phase alternating-current energizing-means for energizing the respective-coils of the respective wattmeter elements in such manner that the pulsating single-phase torques are at times out of phase with each other so as to produce a non-pulsating resultant torque under balanced conditions, said out-of-phase energizing-means comprising a three-conductor relaying source of a set of out-of-phase relaying quantities to which a response is to be obtained, circuit-means for utilizing a different pair of out-of-phase quantities of said set to excite the respective coils of each wattmeter element, whereby a plurality of out-of-phase single-phase responses are obtained in the respective electromagnets, and means for in effect at times open-circuiting one of the three conductors of the relaying source.

20. A wattmeter-type relay comprising a rotatably supported contact-controlling member, three fixedly supported single-phase wattmeter elements operating on said rotatably supported contact-controlling member in such manner as to develop three pulsating single-phase torques therein, each single-phase wattmeter element having two different coils for developing a wattmeter-type torque responsive to the product of the two energizing quantities for the respective coils, multiplied by a function of the phase-angle between said two quantities, and three-phase alternating-current energizing-means for energizing the respective coils of the respective wattmeter elements, said three-phase energizing-means comprising a three-conductor relaying source of a set of three-phase relaying quantities to which a response is to be obtained, circuit-means for utilizing a different pair of out-of-phase quantities of said set to excite the respective coils of each wattmeter element, whereby a plurality of out-of-phase single-phase responses are obtained in the respective electromagnets, and means for in effect at times open-circuiting one of the three conductors of the relaying source.

21. A voltage-restrained directional relay for a polyphase line, comprising a rotatably supported contact-controlling member, fixedly supported power-directional means operating on said rotatably supported contact-controlling member in such manner as to develop a relay-operating torque predeterminedly responsive to a power-directional function of the protected line, and a polyphase voltage-restraint means comprising a plurality of fixedly supported single-phase wattmeter elements operating on said rotatably supported contact-controlling member in such manner as to develop as many pulsating single-phase torques therein, each single-phase wattmeter element having two different coils for developing a wattmeter-type torque responsive to the product of the two energizing quantities for the respective coils, multiplied by a function of the phase-angle between said two quantities, and polyphase-voltage energizing-means for energizing the respective-coils of the respective wattmeter elements in such manner that the pulsating single-phase torques are at times out of phase with each other so as to produce a non-pulsating resultant torque under balanced conditions, said polyphase-voltage energizing-means comprising means for obtaining a set of polyphase relaying voltages from the various phases of the polyphase line, and circuit-means for utilizing a different pair of phases of said polyphase relaying voltages to excite the respective coils of each wattmeter element, whereby a plurality of out-of-phase single-phase responses are obtained in the respective wattmeter elements.

22. A voltage-restrained directional relay for a three-phase line, comprising a rotatably supported contact-controlling member, fixedly supported power-directional means operating on said rotatably supported contact-controlling member in such manner as to develop a relay-operating torque predeterminedly responsive to a power-directional function of the protected line, and a three-phase voltage-restraint means comprising three fixedly supported single-phase wattmeter elements operating on said rotatably supported contact-controlling member in such manner as to develop three pulsating single-phase torques therein, each single-phase wattmeter element having two different coils for developing a wattmeter type torque responsive to the product of the two energizing quantities for the respective coils, multiplied by a function of the phase-angle between said two quantities, and three-phase relaying-voltage energizing-means for energizing the respective coils of the respective wattmeter elements in such manner that the pulsating single-phase torques are at times out of phase with each other so as to produce a non-pulsating resultant torque under balanced conditions, said three-phase relaying-voltage energizing-means comprising means for obtaining a set of three-phase relaying voltages from the various phases of the three-phase line, and circuit-means for utilizing a different pair of phases of said three-phase relaying voltages to excite the respective coils of each wattmeter element, whereby a plurality of out-of-phase single-phase responses are obtained in the respective wattmeter elements.

23. A wattmeter-type relay comprising a rotatably supported contact-controlling member, a loop-type electromagnet-core having two side-legs and two yokes joining the respective ends of the side-legs, the front yoke of said core, adjacent to the axis of said rotatably supported member, being humped at its midpoint which projects toward said axis, said electromagnet-core further having a reentrant leg extending from the midpoint of the rear yoke to an air-gap between the midpoint of the front yoke and the front end of said reentrant leg, said rotatably supported member comprising an inductor-loop having one side in the air-gap of said electromagnet-core, and electromagnet-coil-means for respectively energizing the side-legs and the reentrant leg of the electromagnet-core, the side-leg-energizing magnet-coil-means of the electromagnet being adapted to circulate a flux in loop-fashion around the core.

24. A wattmeter-type relay comprising a rotatably supported contact-controlling member, a plurality of loop-type electromagnet-cores stationarily supported in a common plane and in spaced relation about the axis of said rotatably supported member, each electromagnet core having two side-legs and two yokes joining the respective ends of the side-legs, the front yoke of each core, adjacent to said axis, being humped at its midpoint which projects toward said axis, each electromagnet-core further having a reentrant leg extending from the midpoint of the rear yoke to an air-gap between the midpoint of the front yoke and the front end of said reentrant leg, said rotatably supported member comprising a plurality of inductor-loops, each loop having one side in the air-gap of one of the electromagnet-cores, and a plurality of sets of electromagnet-coil-means for respectively energizing the side-legs and the reentrant leg of each of the respective electromagnet-cores, the side-leg-energizing magnet-coil-means of the respective electromagnets being adapted to circulate a flux in loop-fashion around their cores.

25. A wattmeter-type relay comprising a rotatably supported contact-controlling member, three loop-type electromagnet-cores stationarily supported in a common plane and in spaced relation about the axis of said rotatably supported member, each electromagnet-core having two side-legs and two yokes joining the respective ends of the side-legs, the front yoke of each core, adjacent to said axis, being humped at its midpoint which projects toward said axis, each electromagnet-core further having a reentrant leg extending from the midpoint of the rear yoke to an airgap between the midpoint of the front yoke and the front end of said reentrant leg, said rotatably supported member comprising three inductor-loops, each loop having one side in the air-gap of one of the electromagnet-cores, and a plurality of electromagnet-coil-means for respectively energizing the side-legs and the reentrant leg of each of the respective electromagnet-cores, the side-leg-energizing magnet-coil-means of the respective electromagnets being adapted to circulate a flux in loop-fashion around their cores.

26. A wattmeter-type relay comprising a rotatably supported contact-controlling member, a loop-type electromagnet-core having two side-legs and two yokes joining the respective ends of the side-legs, said electromagnet-core further having a reentrant leg extending from the midpoint of the rear yoke to an air-gap between the midpoint of the front yoke and the front end of said reentrant leg, said front yoke being adjacent to the axis of said rotatably supported member, the rear side of said front yoke, at the midpoint thereof at the aforesaid air-gap, being bulged away from said reentrant leg so as to have non-aligned surfaces on opposite sides of said midpoint at said air-gap, said rotatably supported member comprising an inductor-loop having one side in said air-gap, and electromagnet-coil-means for respectively energizing the side-legs and the reentrant leg of the electromagnet-core, the side-leg-energizing magnet-coil-means of the electromagnet being adapted to circulate a flux in loop-fashion around the core, the reentrant-leg-energizing magnet-coil-means being disposed on the rear portion of said reentrant leg so that the front end of said magnet-coil-means is spaced back from the front end of said reentrant leg whereby to provide a leakage-flux path, in front of said reentrant-leg magnet-coil-means, from the front portion of said reentrant leg to the respective side-legs of the electromagnet-core, at least the front end of said reentrant leg, adjacent to the air-gap, being of a narrow width and of a sufficiently small cross-section to become saturated during high-current exciting-conditions of said reentrant-leg magnet-coil-means, whereby to increase said leakage flux.

27. A wattmeter-type relay comprising a rotatably supported contact-controlling member, a plurality of loop-type electromagnet-cores stationarily supported in a common plane and in spaced relation about the axis of said rotatably supported member, each electromagnet-core having two side-legs and two yokes joining the respective ends of the side-legs, each electromagnet-core further having a reentrant leg extending from the midpoint of the rear yoke to an airgap between the midpoint of the front yoke and the front end of said reentrant leg, the front yokes of the plurality of electromagnet-cores being adjacent to said axis, the rear side of each front yoke, at its midpoint at its air-gap, being bulged away from the reentrant leg of its electromagnet-core so as to have non-aligned surfaces on opposite sides of said midpoint at said air-gap, said rotatably supported member comprising a plurality of inductor-loops, each loop having one side in the air-gap of one of the electromagnet-cores, and a plurality of electromagnet-coil-means for respectively energizing the side-legs and the reentrant leg of each of the respective electromagnet-cores, the side-leg-energizing magnet-coil-means of the respective electromagnets being adapted to circulate a flux in loop-fashion around their cores, the reentrant-leg-energizing magnet-coil-means of each electromagnet being disposed on the rear portion of said reentrant leg so that the front end of said magnet-coil-means is spaced back from the front end of said reentrant leg whereby to provide a leakage-flux path, in front of said reentrant-leg magnet-coil-means, from the front portion of said reentrant leg to the respective side-legs of the electromagnet-core, at least the front end of each reentrant leg, adjacent to the air-gap, being of a narrow width and of a sufficiently small cross-section to become saturated during high-current exciting-conditions of said reentrant-leg magnet-coil-means, whereby to increase said leakage flux.

28. The invention as defined in claim 25, characterized by the reentrant-leg-energizing magnet-coil-means of each electromagnet being disposed on the rear portion of its reentrant leg so that the front end of said magnet-coil-means is spaced back from the front end of said reentrant leg whereby to provide a leakage-flux path, in front of said reentrant-leg magnet-coil-means, from the front portion of said reentrant leg to the respective side-legs of the electromagnet-core, at least the front end of each reentrant leg, adjacent to the air-gap, being of a narrow width and of a sufficiently small cross-section to become saturated during high-current exciting-conditions of said reentrant-leg magnet-coil-means, whereby to increase said leakage flux.

29. A wattmeter-type relay comprising a rotatably supported contact-controlling member, a plurality of fixedly supported single-phase wattmeter elements operating on said rotatably supported contact-controlling member in such manner as to develop as many pulsating single-phase torques therein, each single-phase wattmeter element having two different coils for developing a wattmeter-type torque responsive to the product of the two energizing quantities for the respective coils, multiplied by a function of the phase-angle between said two quantities.

30. A wattmeter-type relay comprising a rotatably supported contact-controlling member, three fixedly supported single-phase wattmeter elements operating on said rotatably supported contact-controlling member in such manner as to develop three pulsating single-phase torques therein, each single-phase wattmeter element having two different coils for developing a wattmeter-type torque responsive to the product of the two energizing quantities for the respective coils, multiplied by a function of the phase-angle between said two quantities.

31. A voltage-restrained directional relay for a polyphase line, comprising a rotatably supported contact-controlling member, fixedly supported power-directional means operating on said rotatably supported contact-controlling member in such manner as to develop a relay-operating torque predeterminedly responsive to a power-directional function of the protected line, and a polyphase voltage-restraint means comprising a plurality of fixedly supported single-phase wattmeter elements operating on said rotatably supported contact-controlling member in such manner as to develop as many pulsating single-phase torques therein, each single-phase wattmeter element having two different coils for developing a wattmeter-type torque responsive to the product of the two energizing quantities for the respective coils, multiplied by a function of the phase-angle between said two quantities.

32. A voltage-restrained directional relay for a three-phase line, comprising a rotatably supported contact-controlling member, fixedly supported power-directional means operating on said rotatably supported contact-controlling member in such manner as to develop a relay-operating torque predeterminedly responsive to a power-directional function of the protected line, and a three-phase voltage-restraint means comprising three fixedly supported single-phase wattmeter elements operating on said rotatably supported contact-controlling member in such manner as to develop three pulsating single-phase torques therein, each single-phase wattmeter element having two different coils for developing a wattmeter-type torque responsive to the product of the two energizing quantities for the respective coils, multiplied by a function of the phase-angle between said two quantities.

SHIRLEY L. GOLDSBOROUGH.
BERT V. HOARD.